(12) United States Patent
Xu (10) Patent No.: US 9,380,189 B2
(45) Date of Patent: Jun. 28, 2016

(54) METHOD OF PROVIDING INFORMATION CONFIGURATION FUNCTION IN VIDEO PLAY DEVICE AND VIDEO PLAY DEVICE

(71) Applicants: Hisense Hiview Tech Co., Ltd., Shandong (CN); Hisense USA Corporation, Suwanee, GA (US)

(72) Inventor: Tao Xu, Shandong (CN)

(73) Assignees: Hisense Hiview Tech Co., Ltd. (CN); Hisense USA Corporation, Suwanee, GA (US)

( * ) Notice: Subject to any disclaimer, the term of this patent is extended or adjusted under 35 U.S.C. 154(b) by 36 days.

(21) Appl. No.: 14/480,806

(22) Filed: Sep. 9, 2014

(65) Prior Publication Data

US 2015/0181085 A1   Jun. 25, 2015

(30) Foreign Application Priority Data

Dec. 23, 2013   (CN) .......................... 2013 1 0718950

(51) Int. Cl.
  *H04N 5/92*   (2006.01)
  *H04N 5/765*   (2006.01)
  *H04N 9/80*   (2006.01)
  *H04N 5/14*   (2006.01)
  *H04N 5/76*   (2006.01)
  *G11B 27/00*   (2006.01)

(52) U.S. Cl.
  CPC ..................................... *H04N 5/147* (2013.01)

(58) Field of Classification Search
  USPC .................. 386/326, 200, 239, 248, 278, 291
  See application file for complete search history.

(56) References Cited

U.S. PATENT DOCUMENTS

2008/0008451 A1*   1/2008   Ikeda et al. ..................... 386/95

* cited by examiner

*Primary Examiner* — Daquan Zhao
(74) *Attorney, Agent, or Firm* — DLA Piper LLP (US)

(57) ABSTRACT

Some embodiments of the application provide a method of providing an information configuration function in a video play device and the video play device, where the method includes: acquiring image information generated actually in a process of playing a current frame of video data in a video stream, preset image match information for matching with the image information and frame attribute information of the frame of video data, wherein the frame attribute information corresponds to a register involved in the process of playing the frame of video data; and judging whether the image match information is consistent with the image information generated actually in the process of playing the frame of video data, and if so, then configuring the frame attribute information to the register involved in the process of playing the frame of video data.

17 Claims, 4 Drawing Sheets

METHOD OF PROVIDING INFORMATION CONFIGURATION FUNCTION IN VIDEO PLAY DEVICE AND VIDEO PLAY DEVICE

CROSS-REFERENCES TO RELATED APPLICATIONS

This application claims priority from Chinese Patent Application No. 201310718950.3, filed with the Chinese Patent Office on Dec. 23, 2013 and entitled "Information configuration method and device", which is hereby incorporated by reference in its entirety.

FIELD OF THE INVENTION

The disclosure relates to the field of communications and particularly to a method of providing an information configuration function in a video play device and the video play device.

BACKGROUND OF THE INVENTION

During the process of watching a video by a user, the requirement of a user equipment for the real-time processing of a video stream is relatively high in order to ensure sharp and smooth playing of the video. During the process of playing the video, none of the phenomena of a pause, a jump, a dithering, a lag, etc., of the video is desirable to the user.

At present the video stream is typically processed by processing respective frames of video data in the video stream sequentially using the clock interruption of a field synchronization signal to thereby ensure the consistency of the clock frequency of the field synchronization signal with the frequency at which the video is played, so that the video stream is played sharply and smoothly. In the process of processing a frame of video data in the video stream using the clock interruption of the field synchronization signal, frame attribute information of the frame of video data is configured to a register involved in the process of playing the frame of video data. When the video stream is processed using the prior art as described above, there may be the following drawbacks: the video stream has to be processed by taking into account the function and the write format of the frame of video data and the meaning of the register and other factors in addition to the frame attribute information of the frame of video data, thus complicating the flow of processing the video stream; and since a large amount of video stream needs to be processed using the clock interruption of the field synchronization signal, the frames of video data in the processed video stream tend to become out of order logically so that the play quality of the video fails to be satisfactory to the user; and a result of processing the video stream using the clock interruption of the field synchronization signal may be stored in the kernel driver, thus hindering the processing result from being invoked by the user layer subsequently and restricting functions of the user layer.

In summary, the video stream has to be processed in the prior art by taking into account a number of factors, thus complicating the process, tending to render the frames of video data in the processed video stream to become out of order logically, degrading the play quality of the video, and also hindering the processing result from being invoked by the user layer and consequently restricting functions of the user layer.

SUMMARY OF THE INVENTION

In an aspect, an embodiment of the disclosure provides a method of providing an information configuration function in a video play device, where the method includes:

acquiring image information generated actually in a process of playing a current frame of video data in a video stream, preset image match information for matching with the image information and frame attribute information of the frame of video data, wherein the frame attribute information corresponds to a register involved in the process of playing the frame of video data; and judging whether the image match information is consistent with the image information generated actually in the process of playing the frame of video data, and if so, then configuring the frame attribute information to the register involved in the process of playing the frame of video data.

In another aspect, an embodiment of the disclosure further provides a video play device including:

a memory; and one or more processors, wherein the memory stores computer-readable program codes, and the one or more processors are used to execute the computer-readable program codes to implement:

acquiring image information generated actually in a process of playing a current frame of video data in a video stream, preset image match information for matching with the image information and frame attribute information of the frame of video data, wherein the frame attribute information corresponds to a register involved in the process of playing the frame of video data; and judging whether the image match information is consistent with the image information generated actually in the process of playing the frame of video data, and if so, then configuring the frame attribute information to the register involved in the process of playing the frame of video data.

In a further aspect, an embodiment of the disclosure further provides a non-transitory storage medium storing computer-readable program codes, which may be executed by one or more processors to implement:

acquiring image information generated actually in a process of playing a current frame of video data in a video stream, preset image match information for matching with the image information and frame attribute information of the frame of video data, wherein the frame attribute information corresponds to a register involved in the process of playing the frame of video data; and judging whether the image match information is consistent with the image information generated actually in the process of playing the frame of video data, and if so, then configuring the frame attribute information to the register involved in the process of playing the frame of video data.

DETAILED DESCRIPTION OF THE EMBODIMENTS

Embodiments of the disclosure provide a method of providing an information configuration function in a video play device and the video play device so as to achieve real-time processing of a video stream, to simplify the flow of processing the video stream, to improve the play quality of the video, and to facilitate the user layer to invoke the result of processing the video stream.

It shall be noted that some embodiments of the disclosure will be described below to illustrate some solutions of the disclosure, but these embodiments will be only some but not all of the embodiments of the disclosure. The disclosure of these embodiments shall not be construed to limit the scope of the disclosure.

Figure 1:
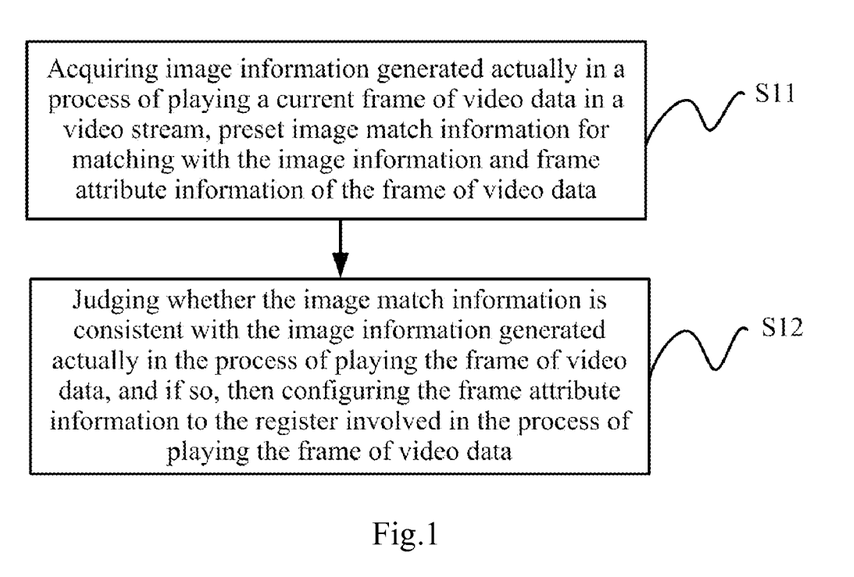
FIG. 1 is a schematic flow chart of a method of providing an information configuration function in a video play device according to an embodiment of the disclosure.

As illustrated in FIG. 1, a method of providing an information configuration function in a video play device according to an embodiment of the disclosure includes:

Step S11: acquiring image information generated actually in a process of playing a current frame of video data in a video stream, preset image match information for matching with the image information and frame attribute information of the frame of video data.

In this case, the frame attribute information corresponds to a register involved in the process of playing the frame of video data. In an embodiment of the disclosure, the actually generated image information refers to information presented actually in the process of playing an image, which can be the width, the height, the interlacing/row-wise pattern, the frame rate and other information of the image; for example, image information for a VGA signal at the resolution of 800×600 and the frequency of 60 Hz includes the width of 800, the height of 600, the row-wise pattern and the frame rate of 60 Hz.

Step 12: judging whether the image match information is consistent with the image information generated actually in the process of playing the frame of video data, and if so, then configuring the frame attribute information to the register involved in the process of playing the frame of video data.

In the step S11, for the location of the current frame of video data in the video stream, the step of acquiring the preset image match information for matching with the image information generated actually in the process of playing the current frame of video data and the frame attribute information of the current frame of video data may be different in the following two scenarios.

In a first scenario, if the current frame of video data is a first frame of video data in the video stream, then the step of acquiring the preset image match information for matching with the image information generated actually in the process of playing the current frame of video data and the frame attribute information of the current frame of video data comprises:

acquiring correspondence relationships between respective frames of video data and frame attribute information of the frames of video data, wherein the correspondence relationships include a plurality of sub-correspondence relationships, each of which corresponds to one frame of video data and includes preset image match information for matching with image information generated actually in a process of playing the frame of video data and a storage address of frame attribute information of the frame of video data; and acquiring a sub-correspondence relationship corresponding to the first frame of video data from the correspondence relationships, acquiring the preset image match information of the first frame of video data and the storage address of the preset frame attribute information of the first frame of video data from the sub-correspondence relationship, and acquiring the preset frame attribute information of the first frame of video data according to the storage address.

In a second scenario, if the current frame of video data is a frame of video data next to the first frame of video data in the video stream, then the step of acquiring the preset image match information for matching with the image information generated actually in the process of playing the current frame of video data and the frame attribute information of the current frame of video data comprises:

acquiring a storage address of a sub-correspondence relationship corresponding to the current frame of video data from a sub-correspondence relationship corresponding to a frame of video data preceding to the current frame of video data, and acquiring the sub-correspondence relationship corresponding to the current frame of video data at the storage address; and acquiring the preset image match information of the current frame of video data and the storage address of the preset frame attribute information of the current frame of video data from the sub-correspondence relationship corresponding to the current frame of video data, and acquiring the preset frame attribute information of the current frame of video data according to the storage address.

Here a sub-correspondence relationship corresponding to one frame of video data except a last frame of video data in the video stream further includes a storage address of a sub-correspondence relationship corresponding to a next frame of video data.

The correspondence relationships are created by the user layer in both of the scenarios described above, and the correspondence relationships are created particularly as follows:

the user layer determines the sub-correspondence relationships corresponding to the respective frames of video data in the same video stream; and the user layer creates the correspondence relationships from the sub-correspondence relationships corresponding to the respective frames of video data in the same video stream in a chronological order in which the frames of video data are played.

When there is a newly added frame of video data in the same video stream, the user layer determines a sub-correspondence relationship corresponding to the newly added frame of video data and adds the sub-correspondence relationship to the correspondence relationships.

The method of providing the information configuration function in the video play according to the embodiment of the disclosure will be described below in a particular example.

In an embodiment of the disclosure, a register refresh module is added, and the user layer creates correspondence relationships between respective frames of video data in a video stream and frame attribute information of the frames of video data, thereby achieving the real-time processing of the video stream, where the register refresh module is used to configure preset frame attribute information of a frame of video data to the register involved in the process of playing the frame of video data.

Figure 2:
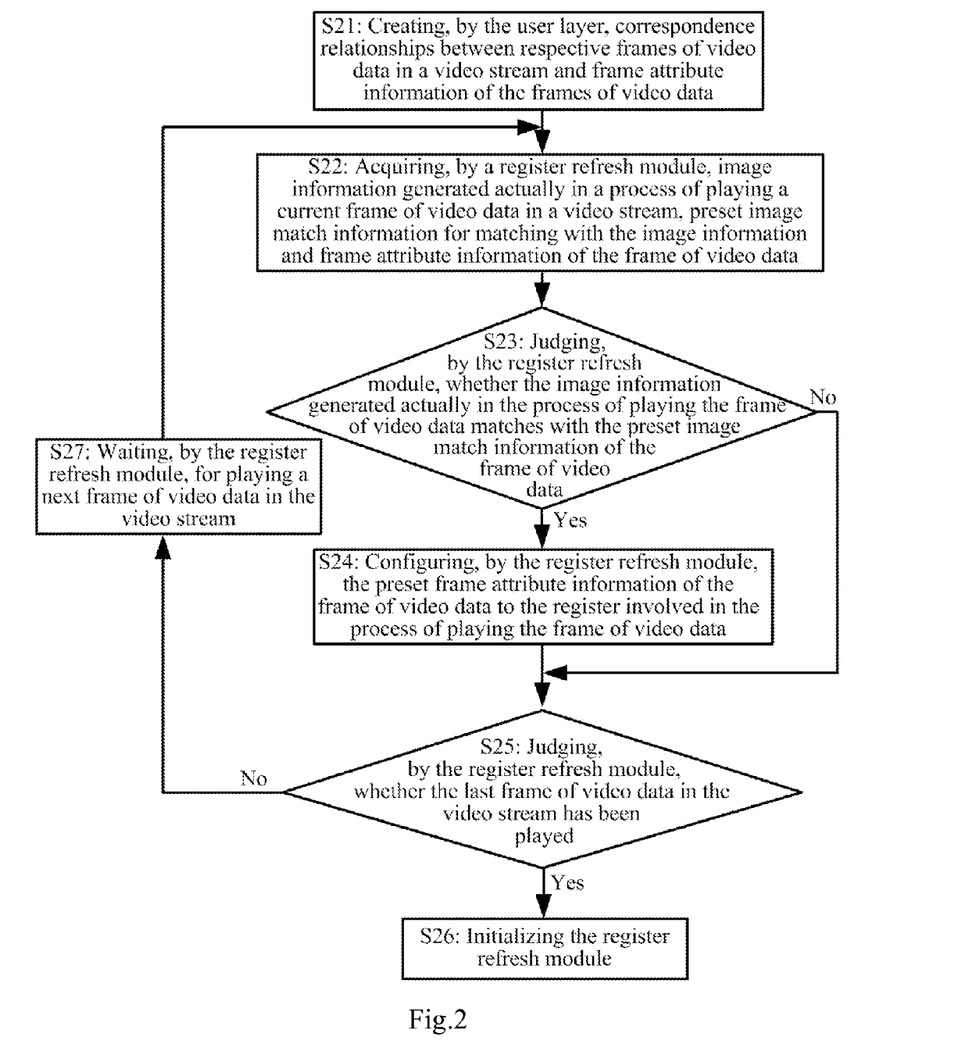
FIG. 2 is a schematic flow chart of a method of processing a video stream in real time according to an embodiment of the disclosure.

As illustrated in FIG. 2, a particular flow of a method of processing a video stream in real time according to an embodiment of the disclosure is as follows:

Step S21: creating, by the user layer, correspondence relationships between respective frames of video data in a video stream and frame attribute information of the frames of video data.

The correspondence relationships are created by the user layer particularly as follows:

the user layer determines the sub-correspondence relationships corresponding to the respective frames of video data in the same video stream, where each of the sub-correspondence relationships includes preset image match information for matching with image information generated actually in the process of playing the corresponding frame of video data and a storage address of frame attribute information of the corresponding frame of video data; and the user layer creates the correspondence relationships from the sub-correspondence relationships corresponding to the respective frames of video data in the same video stream in a chronological order in which the respective frames of video data are played, that is, the correspondence relationships include the sub-correspondence relationships corresponding to the respective frames of video data in the same video stream.

Figure 3:
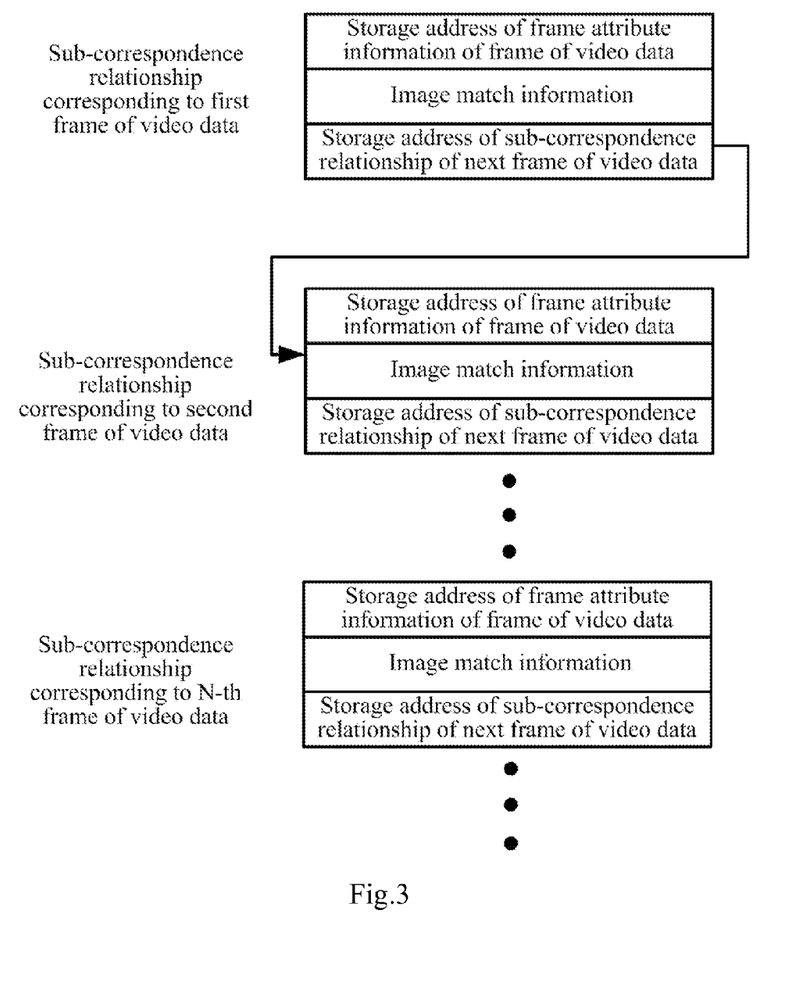
FIG. 3 is a schematic structural diagram of correspondence relationships created by the user layer according to an embodiment of the disclosure.

As illustrated in FIG. 3, the correspondence relationships created by the user layer are stored in the kernel drive; and in the correspondence relationships created by the user layer, a sub-correspondence relationship corresponding to each frame of video data except a last frame of video data further includes a storage address of a sub-correspondence relationship corresponding to a next frame of video data, and each sub-correspondence relationship can further include a storage address, length and other information of the sub-correspondence relationship. It shall be noted that the form of the correspondence relationships created by the user layer can be the form of a list or an alternative form.

Step S22: acquiring, by a register refresh module, image information generated actually in a process of playing a current frame of video data in a video stream, preset image match information for matching with the image information and frame attribute information of the frame of video data.

Particularly, for the location of the current frame of video data in the video stream, the step of acquiring the preset image match information for matching with the image information generated actually in the process of playing the current frame of video data and the frame attribute information of the current frame of video data may be different in the following two scenarios.

In a first scenario, if the current frame of video data is a first frame of video data in the video stream, then the step of acquiring the preset image match information for matching with the image information generated actually in the process of playing the current frame of video data and the frame attribute information of the current frame of video data comprises:

acquiring correspondence relationships between respective frames of video data and frame attribute information of the frames of video data, wherein the correspondence relationships include a plurality of sub-correspondence relationships, each of which corresponds to one frame of video data and includes preset image match information for matching with image information generated actually in a process of playing the frame of video data and a storage address of frame attribute information of the frame of video data; and acquiring a sub-correspondence relationship corresponding to the first frame of video data from the correspondence relationships, acquiring the preset image match information of the first frame of video data and the storage address of the preset frame attribute information of the first frame of video data from the sub-correspondence relationship, and acquiring the preset frame attribute information of the first frame of video data according to the storage address.

In a second scenario, if the current frame of video data is a frame of video data next to the first frame of video data in the video stream, then the step of acquiring the preset image match information for matching with the image information generated actually in the process of playing the current frame of video data and the frame attribute information of the current frame of video data comprises:

acquiring a storage address of a sub-correspondence relationship corresponding to the current frame of video data from a sub-correspondence relationship corresponding to a frame of video data preceding to the current frame of video data, and acquiring the sub-correspondence relationship corresponding to the current frame of video data at the storage address; and acquiring the preset image match information of the current frame of video data and the storage address of the preset frame attribute information of the current frame of video data from the sub-correspondence relationship corresponding to the current frame of video data, and acquiring the preset frame attribute information of the current frame of video data according to the storage address.

Step S23: judging, by the register refresh module, whether the image information generated actually in the process of playing the frame of video data matches with the preset image match information of the frame of video data; if so, performing step S24; otherwise, performing step S25.

Step S24: configuring, by the register refresh module, the preset frame attribute information of the frame of video data to the register involved in the process of playing the frame of video data.

Figure 4:
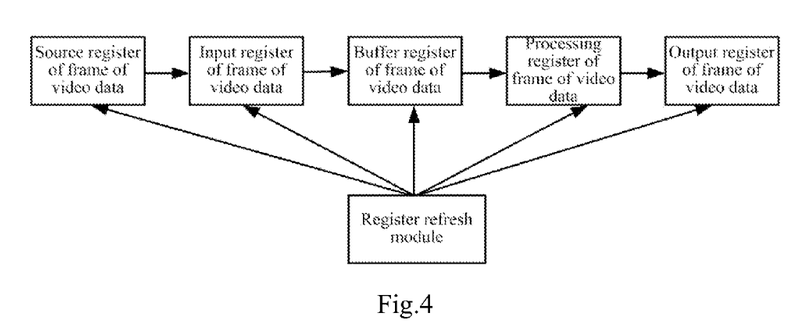
FIG. 4 is a schematic diagram of a connection relationship between a register refresh module and a register involved in the process of playing a frame of video data according to an embodiment of the disclosure.

Here the register involved in the process of playing the frame of video data may include a source register, an input register, a buffer register, a processing register and an output register of the frame of video data, and particularly a register involved in the process of playing a different frame of video data may vary. FIG. 4 is a schematic diagram of a connection relationship between the register refresh module and the register involved in the process of playing the frame of video data.

Step S25: judging, by the register refresh module, whether the last frame of video data in the video stream has been played; if so, performing step S26; otherwise, performing step S27.

Step S26: initializing the register refresh module, that is, removing all of information about the video stream from the register refresh module.

Step S27: waiting, by the register refresh module, for playing a next frame of video data in the video stream.

Here the register refresh module can be functionally set by the kernel drive and configured with an interface by the kernel drive. The flow of processing each frame of video data in the video stream by the register refresh module should be completed in the process of playing the frame of video data.

It shall be noted that the register refresh module can be embodied in hardware or can be embodied by software simulation; and the disclosure will not be limited to any implementation mode of the register refresh module.

Figure 5:
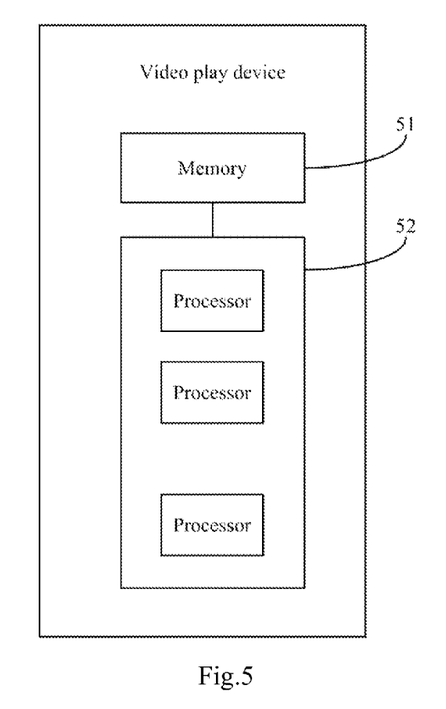
FIG. 5 is a schematic structural diagram of a video play device according to an embodiment of the disclosure.

As illustrated in FIG. 5, an embodiment of the disclosure provides a video play device, e.g., a TV set, a handset, a tablet PC, where the video play device includes:

a memory 51; and one or more processors 52, where the memory 51 stores computer-readable program codes, and the one or more processors 52 are used to execute the computer-readable program codes to implement:

acquiring image information generated actually in a process of playing a current frame of video data in a video stream, preset image match information for matching with the image information and frame attribute information of the frame of video data, wherein the frame attribute information corresponds to a register involved in the process of playing the frame of video data; and judging whether the image match information is consistent with the image information generated actually in the process of playing the frame of video data, and if so, then configuring the frame attribute information to the register involved in the process of playing the frame of video data.

In an embodiment of the disclosure, if the current frame of video data is a first frame of video data in the video stream, then acquiring the preset image match information for matching with the image information generated actually in the process of playing the current frame of video data and the frame attribute information of the current frame of video data includes:

acquiring correspondence relationships between respective frames of video data and frame attribute information of the frames of video data, wherein the correspondence relationships include a plurality of sub-correspondence relationships, each of which corresponds to one frame of video data and includes preset image match information for matching with image information generated actually in a process of playing the frame of video data and a storage address of frame attribute information of the frame of video data; and acquiring a sub-correspondence relationship corresponding to the first frame of video data from the correspondence relationships, and acquiring preset image match information of the first frame of video data and preset frame attribute information of the first frame of video data from the sub-correspondence relationship.

In an embodiment of the disclosure, a sub-correspondence relationship corresponding to one frame of video data except a last frame of video data in the video stream further includes a storage address of a sub-correspondence relationship corresponding to a next frame of video data.

If the current frame of video data is a frame of video data next to the first frame of video data in the video stream, then when acquiring the preset image match information for matching with the image information generated actually in the process of playing the current frame of video data and the frame attribute information of the current frame of video data, the one or more processors 52 are further used to execute the computer-readable program codes to implement:

acquiring a storage address of a sub-correspondence relationship corresponding to the current frame of video data from a sub-correspondence relationship corresponding to a frame of video data preceding to the current frame of video data, and acquiring the sub-correspondence relationship corresponding to the current frame of video data at the storage address; and acquiring the preset image match information of the current frame of video data and the preset frame attribute information of the current frame of video data from the sub-correspondence relationship corresponding to the current frame of video data.

In an embodiment of the disclosure, the one or more processors 52 are further used to execute the computer-readable program codes to implement:

creating the correspondence relationships between the respective frames of video data and the frame attribute information of the frames of video data.

In an embodiment of the disclosure, creating the correspondence relationships between the respective frames of video data and the frame attribute information of the frames of video data includes:

determining the sub-correspondence relationships corresponding to the respective frames of video data in the same video stream; and creating the correspondence relationships from the sub-correspondence relationships corresponding to the respective frames of video data in the same video stream in a chronological order in which the frames of video data are played.

In an embodiment of the disclosure, the one or more processors 52 are further used to execute the computer-readable program codes to implement:

determining a sub-correspondence relationship corresponding to a newly added frame of video data in the same video stream and adding the sub-correspondence relationship to the correspondence relationships.

In addition, an embodiment of the disclosure further provides a computer-readable non-transitory storage medium, which may be the computer-readable non-transitory storage medium contained in the memory in any embodiment described above, or may be the computer-readable non-transitory storage medium which exists alone and is not assembled into the terminal. The computer-readable non-transitory storage medium stores one or more programs (in some embodiments, the computer-readable non-transitory storage medium may be one or more magnetic disc storage devices, a flash memory device or other non-transitory solid-state storage devices, a CD-ROM, an optical memory and the like), where the one or more programs are executed by one or more processors to implement the method described in any one of the above embodiments.

As can be apparent from the solutions described above, image match information for matching with image information generated actually in the process of playing a frame of video data and frame attribute information of the frame of video data are preset, and when the frame of video data starts to be played, the image match information is matched with the image information generated actually in the process of playing the frame of video data, and if the match result shows that they are consistent, then it indicates that the preset frame attribute information of the frame of video data complies with the information configuration requirement of the register involved in the process of playing the frame of video data, and then the frame attribute information is configured to the register involved in the process of playing the frame of video data, thereby achieving the real-time processing of respective frames of video data in the video stream. Since frame attribute information of the frames of video data in the video stream is preset, the disclosure can simplify the flow of processing the video stream and avoid the frames of video data in the processed video stream from becoming out of order logically to thereby improve the play quality of the video.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore, the disclosure can be embodied in the form of a computer program product embodied in one or more computer useable storage mediums (including but not limited to a disk memory, a CD-ROM, an optical memory, etc.) in which computer useable program codes are contained.

The disclosure has been described with reference to flow charts and/or block diagrams of the method, the device (system) and the computer program product according to the embodiments of the disclosure. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Evidently those skilled in the art can make various modifications and variations to the disclosure without departing from the spirit and scope of the disclosure. Thus the disclosure is also intended to encompass these modifications and variations thereto so long as these modifications and variations come into the scope of the claims appended to the disclosure and their equivalents.

The invention claimed is:

1. A method of providing an information configuration function in a video play device, the method comprising:
    acquiring image information generated actually in a process of playing a current frame of video data in a video stream, preset image match information for matching with the image information and frame attribute information of the frame of video data, wherein the frame attribute information corresponds to a register involved in the process of playing the frame of video data; and
    judging whether the image match information is consistent with the image information generated actually in the process of playing the frame of video data, and if so, then configuring the frame attribute information to the register involved in the process of playing the frame of video data.

2. The method according to claim 1, wherein if the current frame of video data is a first frame of video data in the video stream, then acquiring the preset image match information for matching with the image information generated actually in the process of playing the current frame of video data and the frame attribute information of the current frame of video data comprises:
    acquiring correspondence relationships between respective frames of video data and frame attribute information of the frames of video data, wherein the correspondence relationships include a plurality of sub-correspondence relationships, each of which corresponds to one frame of video data and includes preset image match information for matching with image information generated actually in a process of playing the frame of video data and a storage address of frame attribute information of the frame of video data; and
    acquiring a sub-correspondence relationship corresponding to the first frame of video data from the correspondence relationships, and acquiring preset image match information of the first frame of video data and preset frame attribute information of the first frame of video data from the sub-correspondence relationship.

3. The method according to claim 2, wherein a sub-correspondence relationship corresponding to one frame of video data except a last frame of video data in the video stream further includes a storage address of a sub-correspondence relationship corresponding to a next frame of video data; and
    if the current frame of video data is a frame of video data next to the first frame of video data in the video stream, then acquiring the preset image match information for matching with the image information generated actually in the process of playing the current frame of video data and the frame attribute information of the current frame of video data comprises:
    acquiring a storage address of a sub-correspondence relationship corresponding to the current frame of video data from a sub-correspondence relationship corresponding to a frame of video data preceding to the current frame of video data, and acquiring the sub-correspondence relationship corresponding to the current frame of video data at the storage address; and
    acquiring the preset image match information of the current frame of video data and the preset frame attribute information of the current frame of video data from the sub-correspondence relationship corresponding to the current frame of video data.

4. The method according to claim 2, wherein the correspondence relationships are created as follows:
    determining, by a user layer, the sub-correspondence relationships corresponding to the respective frames of video data in the same video stream; and
    creating, by the user layer, the correspondence relationships from the sub-correspondence relationships corresponding to the respective frames of video data in the same video stream in a chronological order in which the frames of video data are played.

5. The method according to claim 4, further comprising:
    determining, by the user layer, a sub-correspondence relationship corresponding to a newly added frame of video data in the same video stream and adding the sub-correspondence relationship to the correspondence relationships.

6. The method according to claim 3, wherein the correspondence relationships are created as follows:
    determining, by a user layer, the sub-correspondence relationships corresponding to the respective frames of video data in the same video stream; and
    creating, by the user layer, the correspondence relationships from the sub-correspondence relationships corresponding to the respective frames of video data in the same video stream in a chronological order in which the frames of video data are played.

7. The method according to claim 6, further comprising:
    determining, by the user layer, a sub-correspondence relationship corresponding to a newly added frame of video data in the same video stream and adding the sub-correspondence relationship to the correspondence relationships.

8. A video play device, comprising:
a memory; and
one or more processors, wherein the memory stores computer-readable program codes, and the one or more processors are used to execute the computer-readable program codes to implement:

acquiring image information generated actually in a process of playing a current frame of video data in a video stream, preset image match information for matching with the image information and frame attribute information of the frame of video data, wherein the frame attribute information corresponds to a register involved in the process of playing the frame of video data; and judging whether the image match information is consistent with the image information generated actually in the process of playing the frame of video data, and if so, then configuring the frame attribute information to the register involved in the process of playing the frame of video data.

9. The video play device according to claim 8, wherein if the current frame of video data is a first frame of video data in the video stream, then acquiring the preset image match information for matching with the image information generated actually in the process of playing the current frame of video data and the frame attribute information of the current frame of video data comprises:

acquiring correspondence relationships between respective frames of video data and frame attribute information of the frames of video data, wherein the correspondence relationships include a plurality of sub-correspondence relationships, each of which corresponds to one frame of video data and includes preset image match information for matching with image information generated actually in a process of playing the frame of video data and a storage address of frame attribute information of the frame of video data; and acquiring a sub-correspondence relationship corresponding to the first frame of video data from the correspondence relationships, and acquiring preset image match information of the first frame of video data and preset frame attribute information of the first frame of video data from the sub-correspondence relationship.

10. The video play device according to claim 9, wherein a sub-correspondence relationship corresponding to one frame of video data except a last frame of video data in the video stream further includes a storage address of a sub-correspondence relationship corresponding to a next frame of video data; and if the current frame of video data is a frame of video data next to the first frame of video data in the video stream, then when acquiring the preset image match information for matching with the image information generated actually in the process of playing the current frame of video data and the frame attribute information of the current frame of video data, the one or more processors are further used to execute the computer-readable program codes to implement:

acquiring a storage address of a sub-correspondence relationship corresponding to the current frame of video data from a sub-correspondence relationship corresponding to a frame of video data preceding to the current frame of video data, and acquiring the sub-correspondence relationship corresponding to the current frame of video data at the storage address; and acquiring the preset image match information of the current frame of video data and the preset frame attribute information of the current frame of video data from the sub-correspondence relationship corresponding to the current frame of video data.

11. The video play device according to claim 9, wherein the one or more processors are further used to execute the computer-readable program codes to implement:

creating the correspondence relationships between the respective frames of video data and the frame attribute information of the frames of video data.

12. The video play device according to claim 11, wherein creating the correspondence relationships between the respective frames of video data and the frame attribute information of the frames of video data comprises:

determining the sub-correspondence relationships corresponding to the respective frames of video data in the same video stream; and creating the correspondence relationships from the sub-correspondence relationships corresponding to the respective frames of video data in the same video stream in a chronological order in which the frames of video data are played.

13. The video play device according to claim 12, wherein the one or more processors are further used to execute the computer-readable program codes to implement:

determining a sub-correspondence relationship corresponding to a newly added frame of video data in the same video stream and adding the sub-correspondence relationship to the correspondence relationships.

14. The video play device according to claim 10, wherein the one or more processors are further used to execute the computer-readable program codes to implement:

creating the correspondence relationships between the respective frames of video data and the frame attribute information of the frames of video data.

15. The video play device according to claim 14, wherein creating the correspondence relationships between the respective frames of video data and the frame attribute information of the frames of video data comprises:

determining the sub-correspondence relationships corresponding to the respective frames of video data in the same video stream; and creating the correspondence relationships from the sub-correspondence relationships corresponding to the respective frames of video data in the same video stream in a chronological order in which the frames of video data are played.

16. The video play device according to claim 15, wherein the one or more processors are further used to execute the computer-readable program codes to implement:

determining a sub-correspondence relationship corresponding to a newly added frame of video data in the same video stream and adding the sub-correspondence relationship to the correspondence relationships.

17. A non-transitory storage medium storing computer-readable program codes which can be executed by one or more processors to implement:

acquiring image information generated actually in a process of playing a current frame of video data in a video stream, preset image match information for matching with the image information and frame attribute information of the frame of video data, wherein the frame attribute information corresponds to a register involved in the process of playing the frame of video data; and judging whether the image match information is consistent with the image information generated actually in the process of playing the frame of video data, and if so, then configuring the frame attribute information to the register involved in the process of playing the frame of video data.

* * * * *